United States Patent
Minto

(10) Patent No.: US 6,196,350 B1
(45) Date of Patent: Mar. 6, 2001

(54) APPARATUS AND METHOD FOR ATTENUATING TUBE WAVES IN A BOREHOLE

(75) Inventor: James Minto, Houston, TX (US)

(73) Assignee: Tomoseis Corporation, Houston, TX (US)

( * ) Notice: Subject to any disclaimer, the term of this patent is extended or adjusted under 35 U.S.C. 154(b) by 0 days.

(21) Appl. No.: 09/413,631

(22) Filed: Oct. 6, 1999

(51) Int. Cl.$^7$ ....................................................... G01V 1/40
(52) U.S. Cl. ............................................ 181/106; 367/911
(58) Field of Search ................................... 181/102, 103, 181/104, 105, 106, 108, 110, 111, 113, 115, 116, 117, 118, 119, 120, 401, 402; 367/57, 176, 911, 912

(56) References Cited

U.S. PATENT DOCUMENTS

| | | | |
|---|---|---|---|
| 3,895,688 | * | 7/1975 | Boyoucos ............................. 181/106 |
| 4,817,755 | | 4/1989 | Gildas . |
| 4,858,718 | | 8/1989 | Chelminski . |
| 4,993,001 | | 2/1991 | Winbow et al. . |
| 5,005,666 | | 4/1991 | Fairborn . |
| 5,170,018 | | 12/1992 | Potier . |
| 5,171,943 | | 12/1992 | Balogh et al. . |
| 5,646,379 | | 7/1997 | Hsu et al. . |

FOREIGN PATENT DOCUMENTS 2 253 054  8/1992  (GB) .

OTHER PUBLICATIONS

S.T. Chen; A Single–Well Profiling Tool and Tube Wave Suppression; Society of Exploration Geophysicists; Expanded Abstracts with Biographies; 63$^{rd}$ Annual Meeting and International Exhibition, Washington, D.C.; Sep. 26–30, 1993; pp. 13–16.

W. Thomas Balogh; The BoreholeTubewave Damper Probe; Society of Exploration Geophysicists Expanded Abstracts with Bibliographies; 62$^{nd}$ Annual International SEG Meeting, New Orleans; Oct. 25–29, 1992; pp. 159–162.

Bob A. Hardage; Crosswell Seismology and Reverse VSP; 1992; Chapter 5; pp. 14763; and chapter 8; pp. 267–278; Geophysical Press Ltd., London, U.K.

J. A. DeBruin and W. Huizer; Radiation from waves in boreholes; Scientific Drilling; 1989; 1: 3–10.

L. D. Pham, C. E. Krohn, T. J. Murray, and S. T. Chen; A Tube Wave Suppression Device for Cross–Well Applications; Society of Exploration Geophysicists; Expanded Abstracts with Biographies; 63$^{rd}$ Annual Meeting and International Exhibition, Washington, D.C.; Sep. 26–30, 1993; pp. 17–20.

* cited by examiner

Primary Examiner—Khanh Dang
(74) Attorney, Agent, or Firm—E. Eugene Thigpen

(57) ABSTRACT

In one embodiment the invention comprises a method of gathering borehole seismic data in which a borehole acoustic instrument is lowered into a borehole in the earth's surface along with a canister positioned about the instrument and a second open bottomed canister positioned below the instrument. The canisters are at least partially filled with gas after the canisters are lowered into borehole. In another embodiment the invention comprises an apparatus for reflecting tube waves in a fluid-filled borehole which includes a canister having a diameter adapted to enable the canister to be deployed within the fluid-filled borehole, and having an open lower end, and an enclosed upper end with an aperture through the upper end adapted for sealing engagement between said upper end and a conduit.

25 Claims, 13 Drawing Sheets

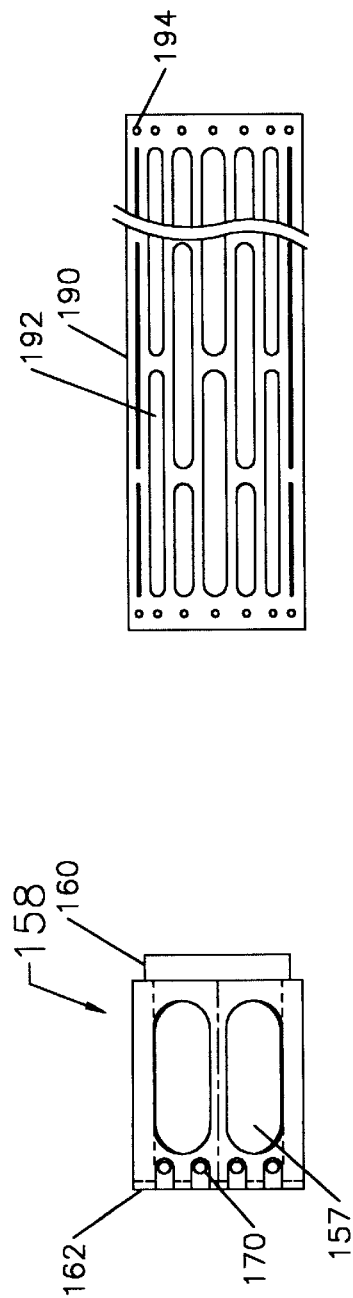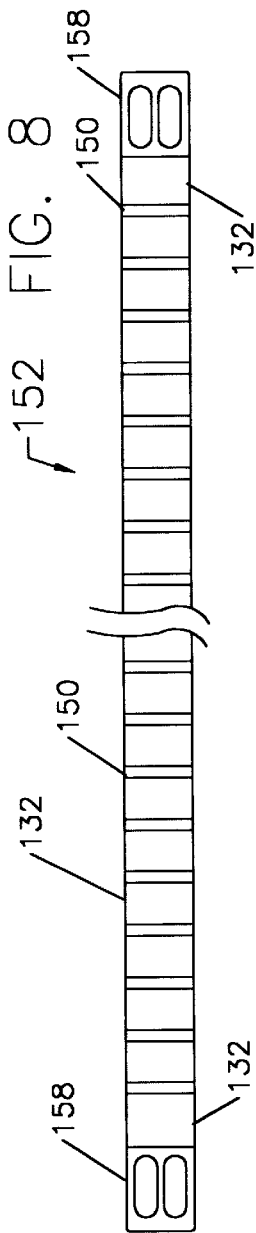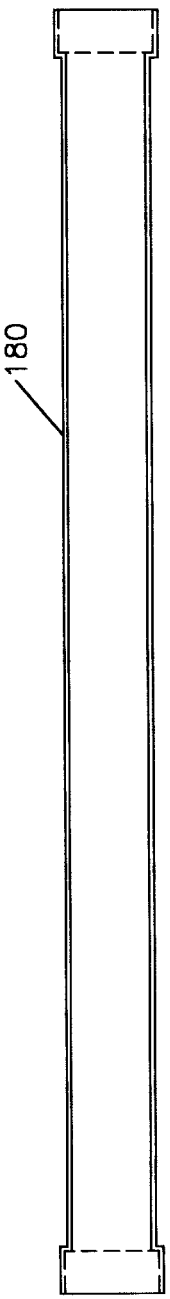

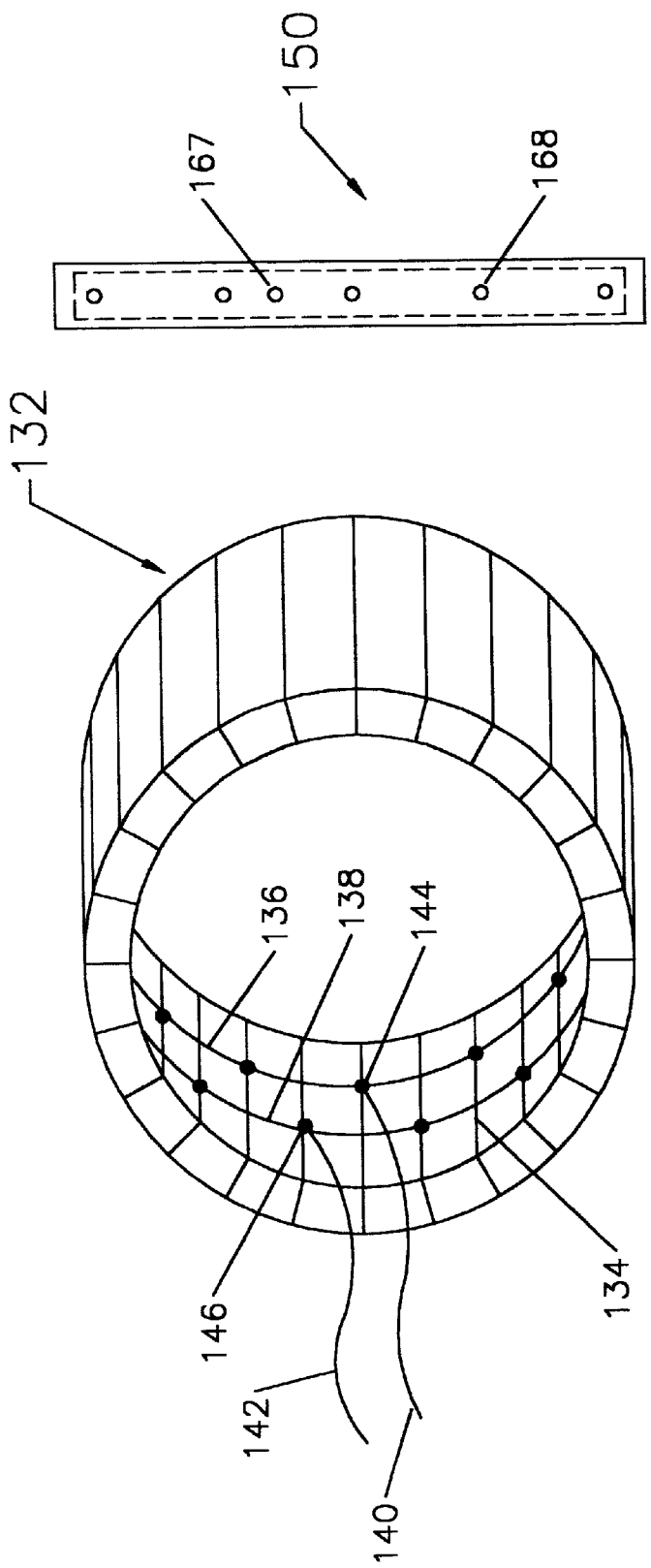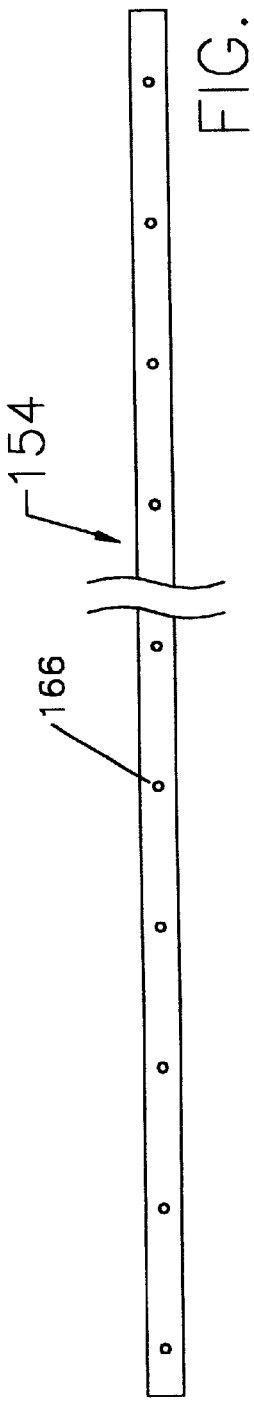

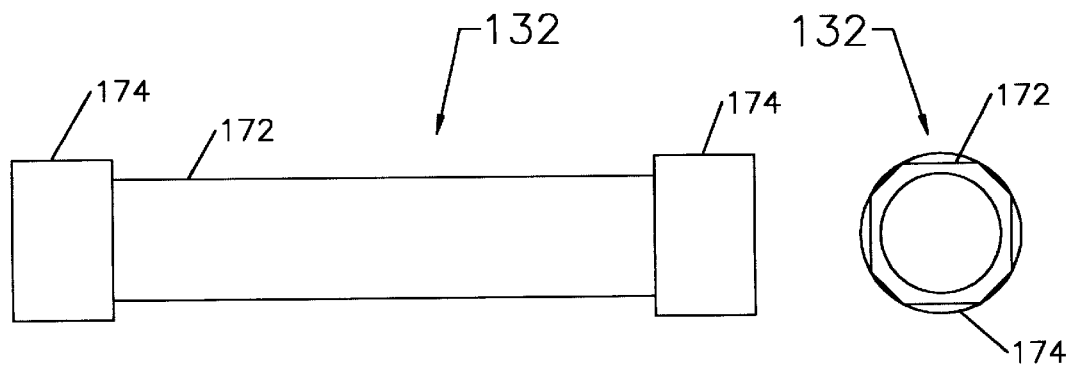
FIG. 13A
FIG. 13B
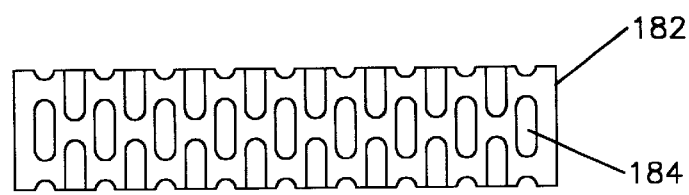
FIG. 13C
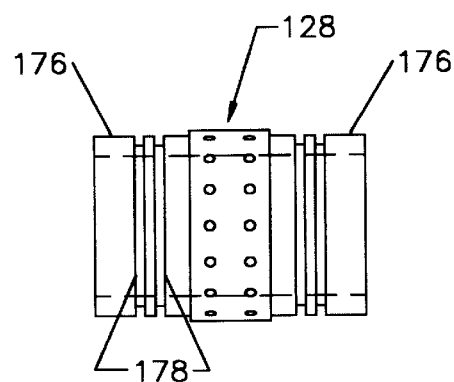
FIG. 14

APPARATUS AND METHOD FOR ATTENUATING TUBE WAVES IN A BOREHOLE

This patent application is related to U.S. patent application Ser. No. 09/413,630, filed on Oct. 6, 1999, Ser. No. 09/002,474, titled "Dual Mode Multiple-Element Resonant Cavity Piezoceramic Borehole Energy Source", having a filing date of Jan. 2, 1998; and a U.S. patent application titled "System for Generating a Seismic Signal in a Borehole", having the same filing date as this present application.

BACKGROUND OF THE INVENTION

Borehole seismic surveys are conducted for the purpose of mapping subsurface geologic structures. In a typical borehole seismic survey, a source is placed in a borehole at a selected depth and excited in order to produce acoustic waves in the adjacent geological formations. Sensors are usually placed at selected depths in the same or another borehole or at the earth's surface in order to detect the acoustic signals after they have propagated through and been reflected from geological formations.

Borehole source instruments may radiate as tube waves thirty to eighty percent of the energy generated by the source. These tube waves propagate through the fluid which fills the wellbore. The liquid filled borehole is a good conductor of tube waves with the inner surface of the well acting as a wave guide. Relatively strong tube waves travel along the borehole downwardly and upwardly from the borehole seismic source each time it is energized. These tube waves are reflected from the top and bottom of the borehole and from discontinuities in the borehole, but a significant amount of energy in the tube waves are converted into body waves which propagate into the earth subsurface surrounding the well. These secondary sound waves, which travel outwardly from the top and bottom of the liquid columns and other discontinuities, will reach the seismic sensors at a later time that the signals which propagate directly from the source; and these later arrival signals cause the record of the signals from the sensors to be cluttered with unwanted signals and difficult to interpret.

During the seismic surveys, acoustic waves generated by the source which reach the borehole in which the receiver is deployed will also propagate vertically in the receiver borehole in the form of tube waves. These tube waves which propagate within the borehole in which the receiver is placed are also detected by the receiver and interfere with the acoustic signals arriving directly from the borehole source. A problem in borehole seismic surveys is distinguishing the desired acoustic waves detected by the sensors in the borehole from the undesired signals resulting from tube waves.

Seismic processing software endeavors to remove these tube wave produced signals from the signal detected by the receivers; however, if the tube waves can be attenuated before they begin propagating in the borehole, the resulting seismic data will be further improved.

Bob A. Hardage, *Crosswell Seismology and Reverse VSP*, Vol. 1, Geophysical Press Limited, 1991, pp. 267–269, in a final chapter titled, Future Needs, shows a tube-wave attenuator positioned above and below a source within a wellbore. It was further disclosed on p.147 of Hardage that "tube propagation into a fluid-filled well can be minimized by inserting a large diameter, air-filled canister or bladder in the fluid column (de Bruin, J. A. and Huizer, W., 1989, Radiation from waves in boreholes: Scientific Drilling, 1, 3–10).

As stated by Hardage on p. 147–148: "Any downhole source that operates in a liquid-filled well inevitably produces tube waves that propagate away from the source activation point and travel up and down the fluid column. In extremely low velocity formations, these tube waves create conical waves that spread into the surrounding earth. In high velocity formations . . . the majority of the tube wave energy is trapped within the fluid column and the earth disturbance attenuates exponentially as the tube wave signal propagates away from the fluid boundary. In this guided wave mode, large amounts of tube wave energy can be released into the earth at points where there is a significant change in the cross-sectional impedance of the tube wave propagation path. The energy released during one of these tube wave conversions propagates away from the borehole discontinuity in the same manner as would the wavefields produced by point seismic source. "The most desirable downhole sources are those that minimize the amount of energy contained in these fluid-born waves." Hardage also disclosed on page 156 that "interface waves in a fluid-filled well can be virtually eliminated by blocking most of the cross-sectional area of the fluid column with an air-filled bladder or canister.

U.S. Pat. No. 4,858,718, which issued to Chelminski on Aug. 22, 1989 shows a method for attenuating tube waves for use with an impulsive downhole seismic source. The patent discloses the use of an inflatable resilient bladder which may be positioned above and below the seismic source which attenuates the tube waves which emanate from the source. The bladder is inflated in the wellbore, either by gas supplied from a pressurized gas container attached to the attenuator or through a hose line from a source of pressurized gas located on the surface of the Earth near the mouth of the well. A method of dissipating upwardly traveling tube waves is also disclosed in which numerous gas bubbles are released in the upper portion of the liquid column to generate a bubble barrier in the upper portion of the liquid column in the wellbore.

U.S. Pat. No. 5,170,018, which issued to Potier on Dec. 8, 1992 shows the use of absorptive material, such as cork or Sorbothane, deployed in a non-metallic housing above and below a seismic receiver positioned in a borehole, for the purpose of attenuating tube waves.

U.S. Pat. No. 4,817,755, which issued to Gildas discloses a system for downhole seismic signal generation in which cylindrical elements filled with plastic foam material are deployed above and below an impulsive source, such as primacord, to help attenuate the vertical component of the seismic energy and apply the signal substantially to the walls of the borehole.

U.S. Pat. No. 5,171,943, which issued to Balogh et al. on Dec. 15, 1992, discloses a tube wave damper probe for the suppression of borehole tube waves in seismic applications. The damper comprises a gas-filled bladder within a housing. The bladder is filled with gas before the bladder is inserted into the borehole.

U.S. Pat. No. 4,993,001, which issued to Winbow et al. on Feb. 12, 1991, describes an apparatus for converting tube waves to body waves downhole for seismic exploration. A rotary valve tube wave source produces swept frequence tube waves that are injected into a tubing or wellbore. These tube waves are then converted to body waves by an elongate tube wave converter located downhole, comprising an elongate body having a generally cylindrical center section and tapered ends to convert the tube waves to body waves. The tube wave converter is formed from a material, such as metal, which has a strong acoustic impedance contrast with the liquid in the wellbore so as to convert the tube waves into compressional and shear waves that radiate into the earth for use in seismic exploration.

U.S. Pat. No. 5,646,379, which issued to Hsu et al. on Jul. 8, 1997, discloses an attenuator for use in attenuating tube waves in a borehole which includes a body formed from a permeable material having a rigid matrix, such as natural or synthetic rock or a sintered particulate material, which can be saturated with fluid. The shape of the attenuator may be a cylinder or it may be modified to reduce the amount of reflection of tube waves in the borehole. Suggested shapes include two cones placed base to base, or a cylinder having conically tapered ends.

S. T. Chen, "A Single-Well Profiling Tool and Tube Wave Suppression" Expanded Abstract, SEG, 13–16, 1993, discusses an acoustic source comprising a stack of hollow PZT cylinders driving two end hemispherical masses.

W. T. Balogh, "The Borehole Tubewave Damper Probe" Expanded Abstracts, SEG, 159–162, 1992, describes a tube wave damper probe which utilizes a gas-filled bladder to attenuate borehole tube waves.

L. D. Pham, C. E. Krohn, T. J. Murray, and S. T. Chen, "A Tube Wave Suppression Device for Cross-Well Applications" Expanded Abstracts, SEG, 17–20, 1993 describes the use of a cylindrical porous but impermeable body between the source and receiver. Mineral which is proposed for such use is a material called "syntactic foam". UK Patent Application GB 2253054 describes the use of cork, an absorptive, compressible material, in the form of disks and balls as an attenuator. However, the effectiveness of both cork and syntactic foam is depth dependent.

U.S. Pat. No. 5,005,666, which issued to Fairborn on Apr. 9, 1991, discloses the use of inflatable bladders with seismic receivers in a borehole in order to isolate the receivers from tube waves. However, there are no teachings regarding what the bladders should be made of, what they should be inflated with, or when they should be inflated.

SUMMARY OF THE INVENTION

In one embodiment the invention comprises a method of gathering borehole seismic data in which a borehole acoustic instrument is lowered into a borehole in the earth's surface along with an open bottomed canister positioned above the instrument and a second open bottomed canister positioned below the instrument. The canisters are at least partially filled with gas after the canisters are lowered into the borehole. In another embodiment the invention comprises an apparatus for reflecting tube waves in a fluid-filled borehole which includes a canister having a diameter adapted to enable the canister to be deployed within the fluid-filled borehole, and having an open lower end, and an enclosed upper end with an aperture through the upper end adapted for sealing engagement between said upper end and a conduit.

BRIEF DESCRIPTION OF THE DRAWINGS

FIG. 7 shows a cylindrical sleeve for enclosing the piezoceramic actuator.

FIG. 8 shows a piezoelectric actuator comprising a plurality of piezoceramic cylinder elements.

FIG. 9 shows a mounting isolator which may be positioned at either end of the actuator shown in FIG. 8.

FIG. 10 shows a piezoceramic cylinder configuration.

FIG. 11 shows a mounting ring used to physically align and electrically isolate the piezoceramic cylinders.

FIG. 12 shows a strut which may be used to extend along the length of the piezoceramic cylinders to provide structural integrity.

FIGS. 13A, 13B and 13C show elements of the compliant end members useful for increasing power output from a borehole source.

FIG. 14 shows a connector which may be used to connect the compliant end members to the piezoceramic actuator.

FIG. 15 shows an exoskeleton which may be attached to the exterior of a borehole seismic source for structural support.

DESCRIPTION OF THE PREFERRED EMBODIMENT

Figure 1:
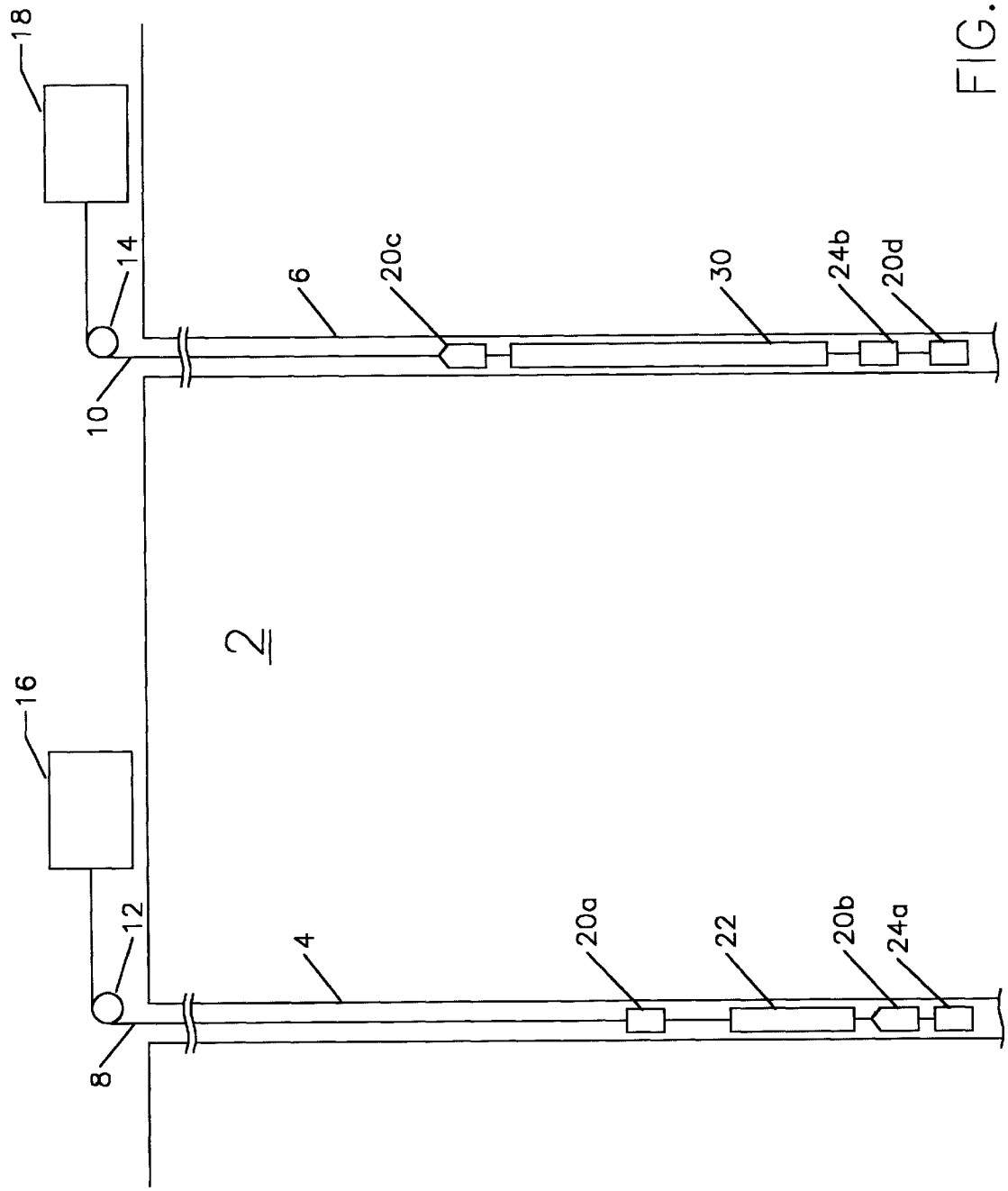
FIG. 1 shows the deployment of the invention in a borehole seismic survey in which the seismic borehole source and seismic borehole receiver are deployed in separate boreholes.
Figure 2:
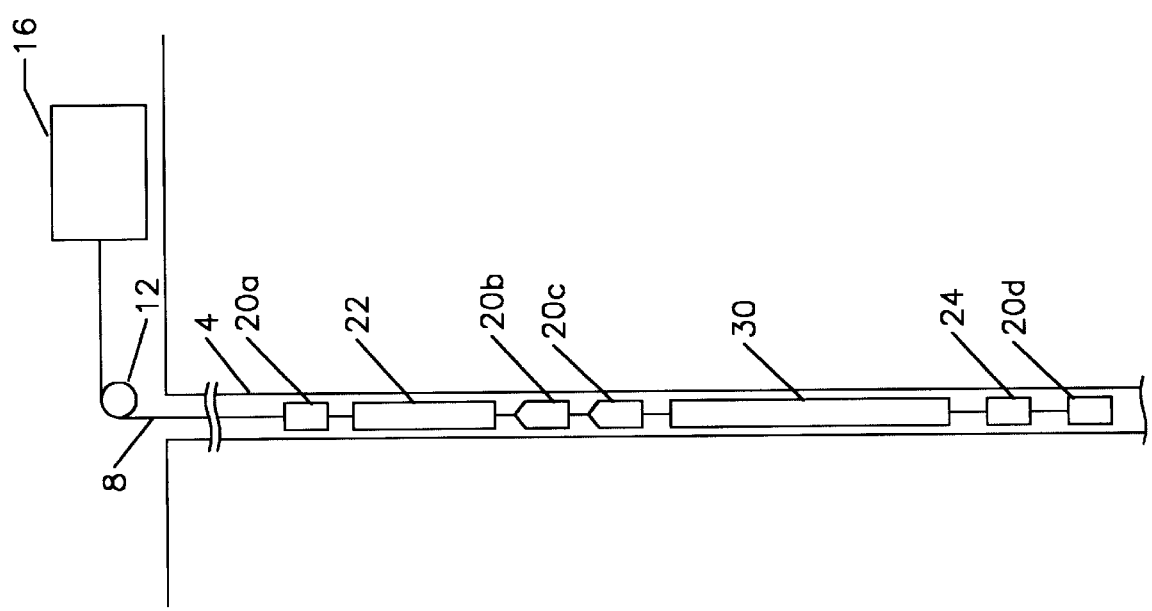
FIG. 2 shows the deployment of the invention in a borehole seismic survey in which the seismic borehole source and seismic borehole receiver are deployed in the same borehole.

FIG. 1 shows a first implementation of the invention, in which a borehole seismic source is deployed in a first borehole 4 and a seismic receiver is deployed in a second borehole 6. Boreholes 4 and 6 penetrate a region 2 of the earth's subsurface. FIG. 2 shows a second implementation of the invention in which a borehole seismic source and a borehole seismic receiver are both deployed in the same borehole, designated as borehole 4.

Referring to FIG. 1, borehole source 22 is deployed within the borehole by means of wireline 8. Wireline 8 is lowered into the borehole 4 and retrieved from the borehole by means of winch mechanism 12, which may be of a type generally used in the industry. Tube wave deflector 20a is positioned along wireline 8 above source 22, and tube wave deflector 20b is positioned along wireline 8 below the source 22. In one particular embodiment of the invention compressed gas storage container 24a is positioned along the wireline 8 below tube wave deflector 20b. Control signals are transmitted downhole from source control instrumentation system 16 through wireline 8.

Also shown in FIG. 1 is a borehole receiver 30, which is deployed in borehole 6 by means of wireline 10. Wireline 10 is lowered into the borehole 6 and retrieved from the borehole by means of winch mechanism 14, which may be of a type generally used in the industry. Tube wave deflector 20c is deployed above borehole receiver 30 and tube wave deflector 20d is deployed below borehole receiver 30. In one particular embodiment of the invention compressed gas storage container 24b is positioned along wireline 10 above tube wave deflector 20d. Control signals are transmitted downhole from receiver control instrumentation system 18 and detected signals are transmitted from receiver 30 to the receiver control instrumentation system 18 by means of wireline 10. The receiver 30 may be hydrophones or fiber optic detectors of a type known to those of ordinary skill in the art. Alternatively, the receiver may be geophones or accelerometers, which would require the receiver to be clamped to the borehole wall in order to detect a seismic signal. Seismic signals generated by source 22 will propagate through the earth's subsurface along various ray paths and will be detected by receiver 30. Those of ordinary skill in the art will recognize that receiver 30 may also comprise a receiver array, which includes a plurality of separate spaced apart receivers, in order to detect signals at a plurality of depths while the receiver is at one location in the borehole.

Referring to FIG. 2, source 22 and receiver 30 are deployed in the same borehole 4 by means of wireline 8. Tube wave deflectors 20a and 20b are positioned above and below borehole source 22, respectively, and tube wave deflectors 20c and 20d are deployed above and below receiver 30, respectively. A single compressed gas storage container 24 is used in this configuration.

Figure 3A:
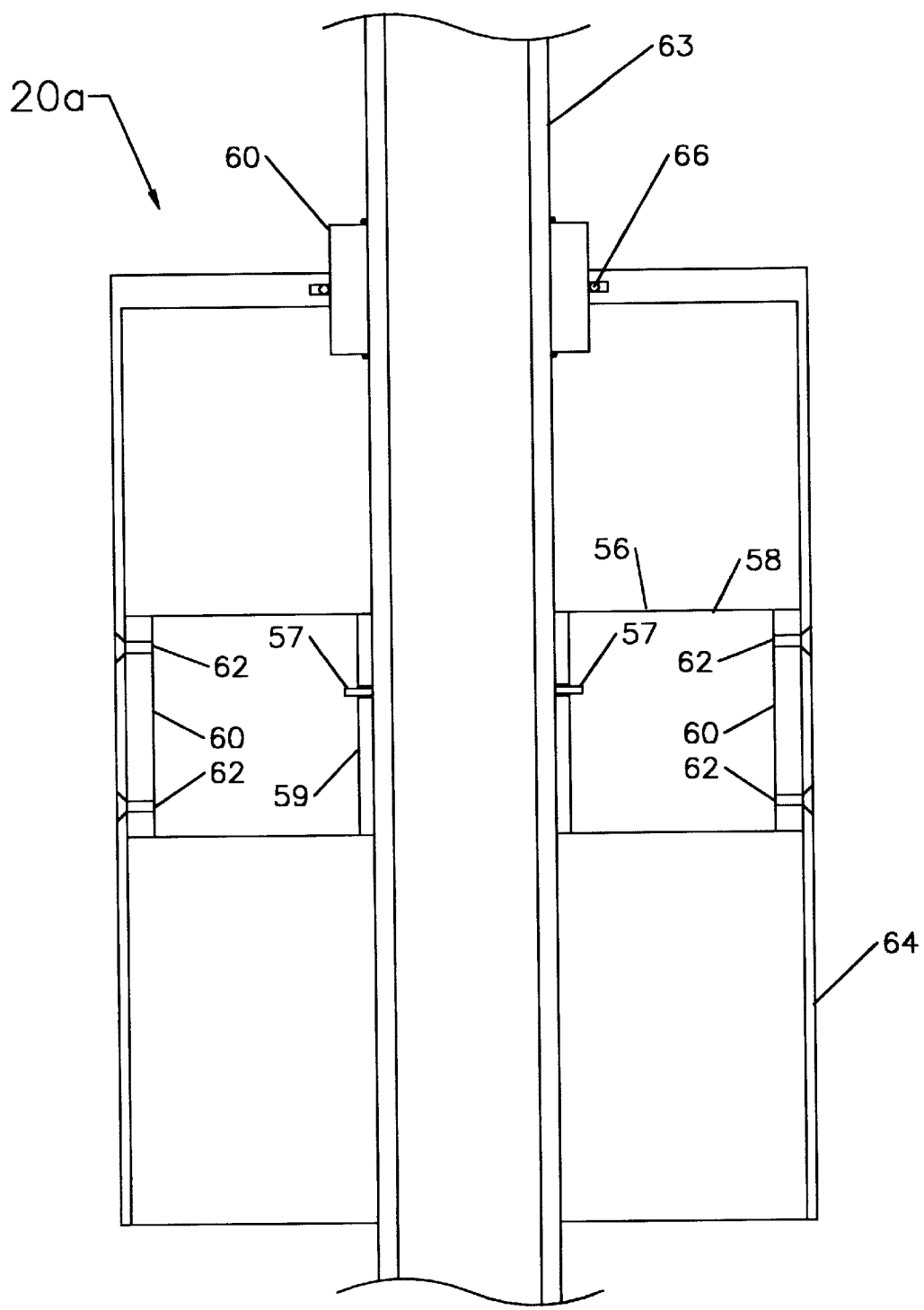
FIGS. 3A, 3B and 3C show different implementations of an apparatus for reflecting tube waves that would otherwise propagate in a borehole.

Referring again to FIG. 1, tube wave deflector 20a is positioned above source 22 to limit the upward propagation of the tube wave resulting from activation of source 22; and tube wave deflector 20b is positioned below source 22 to limit the downward propagation of tube waves. Upon reaching tube wave deflector 20a or 20b, the acoustic energy which would otherwise propagate in the borehole as a tube wave will be substantially reflected. Because the tube waves do not propagate beyond the location of the tube wave deflectors, the tube waves do not reach borehole discontinuities which would result in the generation of secondary body waves The configurations of tube wave deflectors 20a and 20b, according to a particular embodiment of the invention, are shown in FIGS. 3A and 3B.

FIG. 1 also shows tube wave deflectors 20c and 20d deployed in borehole 6, above and below receiver 30. The purpose of tube wave deflector 20c is to reflect any downwardly traveling tube wave energy upwardly so that such tube wave energy does not reach receiver 30; and the purpose of deflector 20d is to reflect downwardly any tube wave energy which is traveling upwardly, so that the region around receiver 30 is maintained substantially free of tube waves. The configurations of tube wave deflectors 20c and 20d, according to a particular embodiment of the invention, are shown in FIGS. 3B and 3C.

In one embodiment of the invention, tube wave deflectors 20a, 20b, 20c and 20d comprise a canister, open at the bottom end. The canisters may be made of a metal, such as stainless steel, or other gas impermeable materials having sufficient ruggedness to withstand borehole conditions. The canisters may be substantially cylindrical and will be at least partially filled with a gas, preferably a nonexplosive, non-oxidizing gas, such as helium or nitrogen. As described above, it is desired for tube wave energy to reflect from the bottoms of tube wave deflectors 20a and 20d and from the tops of tube wave deflectors 20b and 20c. In each instance the reflecting surface needs to have a higher acoustic compliance (lower impedance) than the wellbore fluid. The tube wave deflectors illustrated in FIGS. 3A, 3B and 3C each comprise substantially cylindrical cans which are open at the lower end and are at least partially filled with a gas. Accordingly, the borehole fluid will have a direct interface with the gas at the bottom end of the deflectors. The gas will have a higher compliance than the borehole fluid, so the necessary condition for reflectance is satisfied. The configuration for tube wave deflectors 20a and 20d do not need to reflect tube waves from their top surface. Accordingly, tube wave deflectors 20a and 20d may be constructed as shown in FIGS. 3A and 3C, with the top formed from high impedance material such as stainless steel.

Figure 3B:
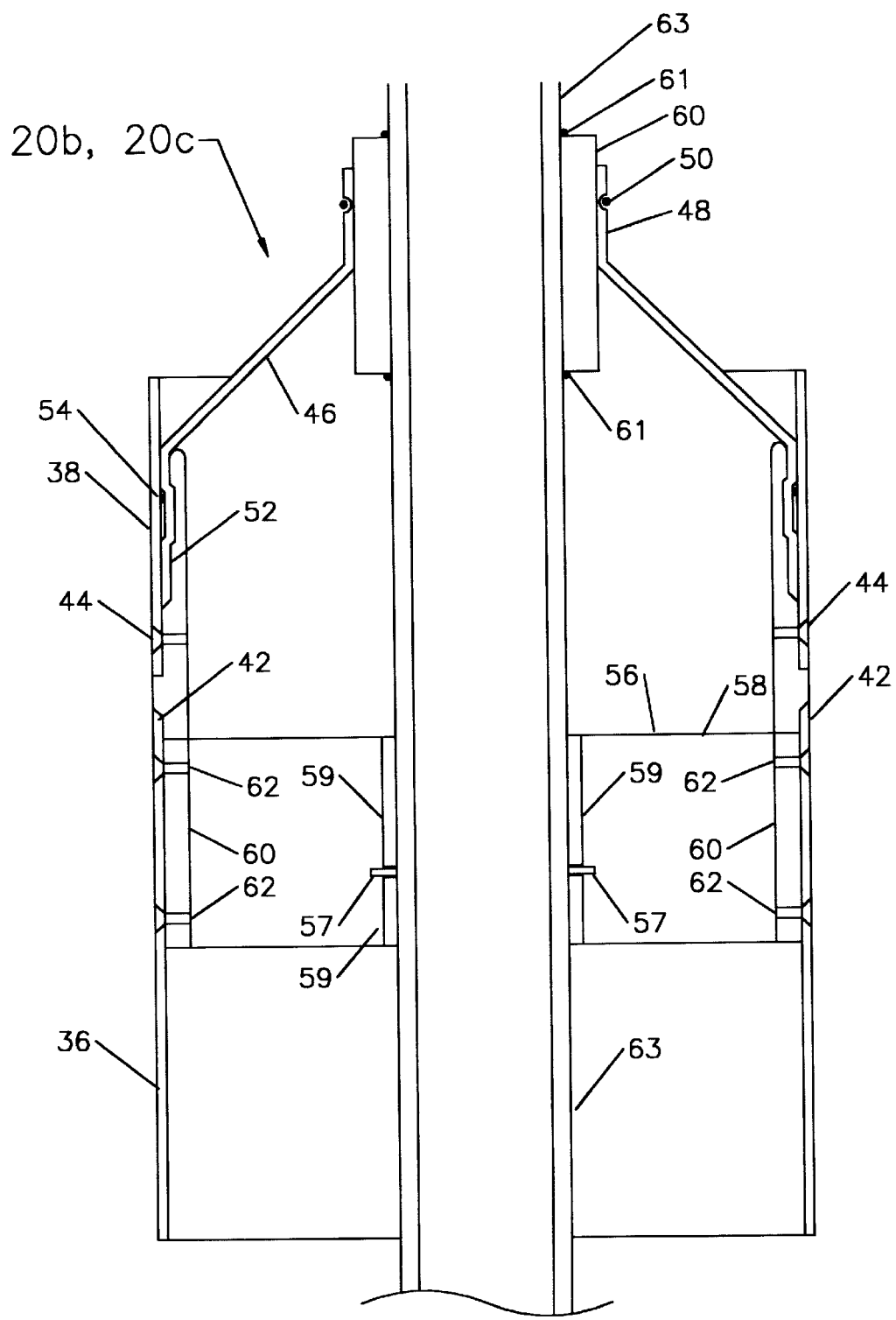
Figure 3C:
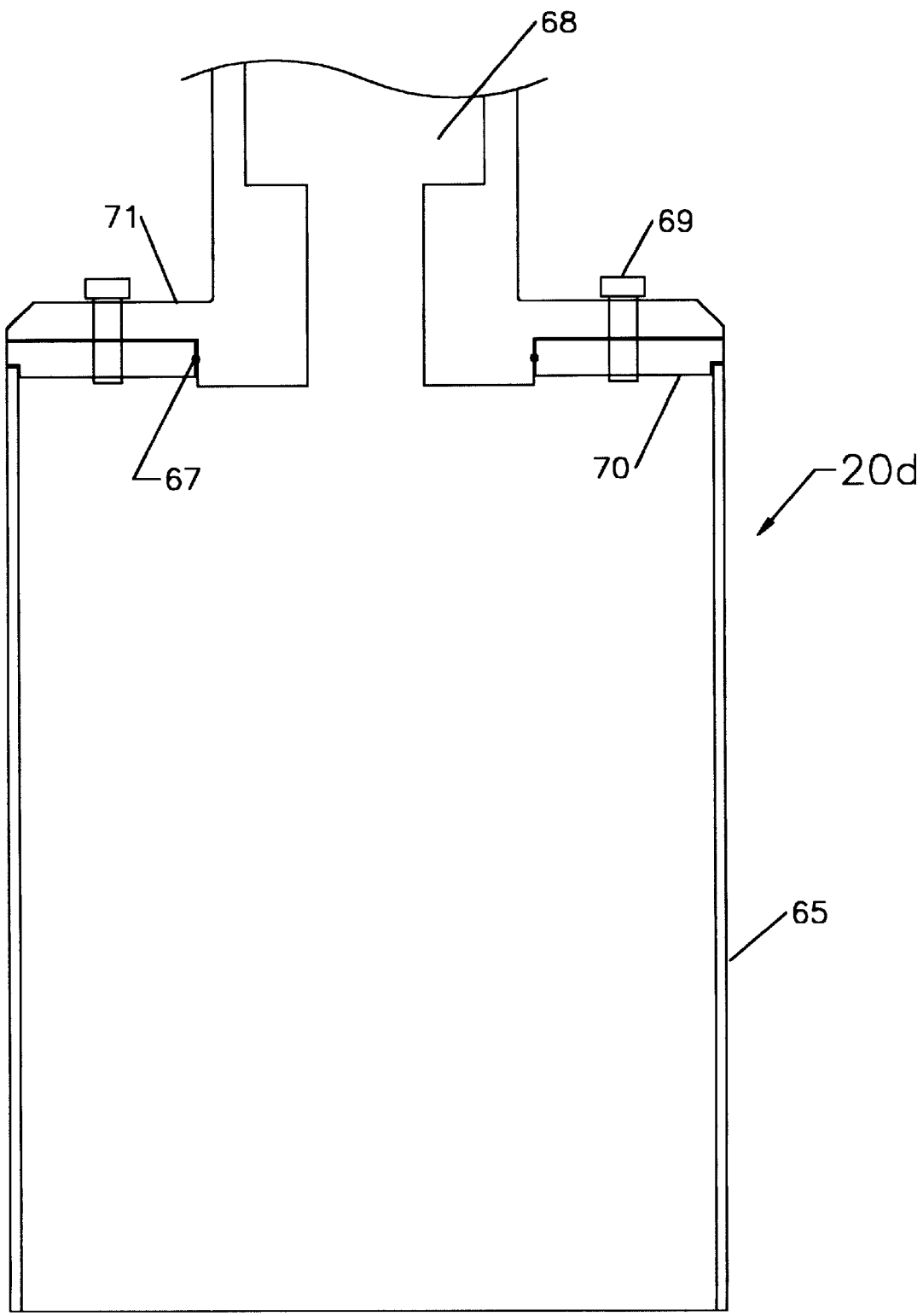

Because tube wave deflectors 20b and 20c will need to have a top surface with a greater compliance than the borehole fluid, a configuration such as shown in FIG. 3B may be utilized. Referring to FIG. 3B, tube wave deflectors 20b and 20c comprise a lower cylindrical section 36 and an upper cylindrical section 40. Upper cylindrical section 40 and lower cylindrical section 36 may be bonded together by welding along the circular connecting location designated by numeral 42. Upper ring section 38 is affixed to upper cylindrical section 40 by means of a plurality of screws 44 which may be substantially evenly spaced about the circumference of the tube wave deflectors. Only two of the screws are shown in FIG. 3B for clarity. Sealing rings (not shown) may be included under the head of each screw 44. The upper surface 46 of the tube wave deflector configuration shown in FIG. 3B comprises a compliant material, which may be a fluoroelastometer material, such as VITON™, a trademark of Dupont-Dow Elastometers, L.L.C., or other elastomeric material having a high acoustic compliance, which is preferably shaped into a conical configuration. Extending downwardly from the outer edge of upper surface 46 is a cylindrical section 52, which extends between upper ring section 38 and upper cylindrical section 40. A cord 54, which may be a nylon cord, may be wrapped around cylindrical section 52 of upper surface 46 to provide a seal to prevent the borehole fluid from entering the tube wave deflector and to prevent gases from escaping from the canister. Upper surface 46 may include a tubular section 48 within the center of the conical surface, which extends upwardly so that it can surround mounting block 60, which is secured to the tubular conduit 63 by welding at locations 61. Tubular conduit 63 is coupled to the wireline (not shown) above the tube wave deflector and extends through the axial center of the tube wave deflector to provide a conduit through the tube wave deflector for the wireline. Wrapping cord 50, which may be a nylon cord, may be wrapped around tubular section 48 to form a seal between tubular section 48 and mounting block 60, to prevent gases from escaping upwardly from the canister.

Spacer 56 maintains the canister formed by the lower cylindrical section 36, upper cylindrical section 40 and upper surface 46 substantially in axial alignment with tubular conduit 63 for structural stability. Although only one spacer 56 is shown, the tube wave deflectors may be five feet or greater in length, and it may be desirable to utilize a plurality of such spacers. In a particular embodiment of the invention, spacer 56 may comprise four vanes 58 deployed at 90 degree angles around tubular conduit 63 and extending to the inner surface of the lower cylindrical section 36. Each vane may include a flange section 60, which is secured to lower cylindrical section 36 by means of screws 62. Sealing rings (not shown) may be included under the head of each screw 62. Each vane 58 may terminate in an arcuate section 59 which is keyed to tubular conduit 63. Pins 57 are welded to tubular conduit 63, and apertures in the arcuate sections 59 fit onto the pins 57 to maintain vanes 58 in position.

Because the configurations for tube wave deflector 20a and 20d do not need to be reflective from their upper surface, the simpler tube wave deflector configuration shown in FIGS. 3A and 3C may be utilized. With reference to FIG. 3A, which shows tube wave deflector 20a in more detail, spacer 56 may be of the same configuration as for the tube wave deflector shown in FIG. 3B, and like parts are designated by the same reference designator. The canister portion 64 of tube wave deflector 20*a* may be formed from a unitary structure comprising a hollow cylinder, with an open bottom and closed top portion. O-rings 66 provide a seal between the upper surface of canister portion 64 and mounting block 60 to prevent borehole fluid from entering the tube wave deflector. Mounting block 60 is affixed to tubular conduit 63 by welding at locations 61. Tube wave deflector 20*a* is maintained in position on tubular conduit 63 by means of pins 57, as described above with reference to FIG. 3B.

FIG. 3C shows a configuration for a tube wave deflector which may be utilized for tube wave deflector 20*d*. Tube wave deflector 20*d* is deployed at the bottom of wireline 10, and for that reason, tubular conduit 63 is not required. Compressed gas is inserted into tube wave deflector 20*d* through conduit 68 directly from compressed gas storage container 24*b*. The configuration of tube wave deflector 20*d* comprises an open bottom cylindrical portion 65, a top cap portion 70 welded thereto, and a head member 71, which is bolted to the top cap portion by bolts 69. O-ring seal 67 is utilized to prevent borehole fluid from entering the tube wave deflector and to prevent gases from escaping.

Although use of the tube wave deflectors has been described in terms of a seismic survey in which both the seismic source and seismic receiver are deployed in a borehole, VSP (vertical seismic profiling) surveys, in which either the source or the receiver is located at the earth's surface are also within the scope of the invention.

Figure 4:
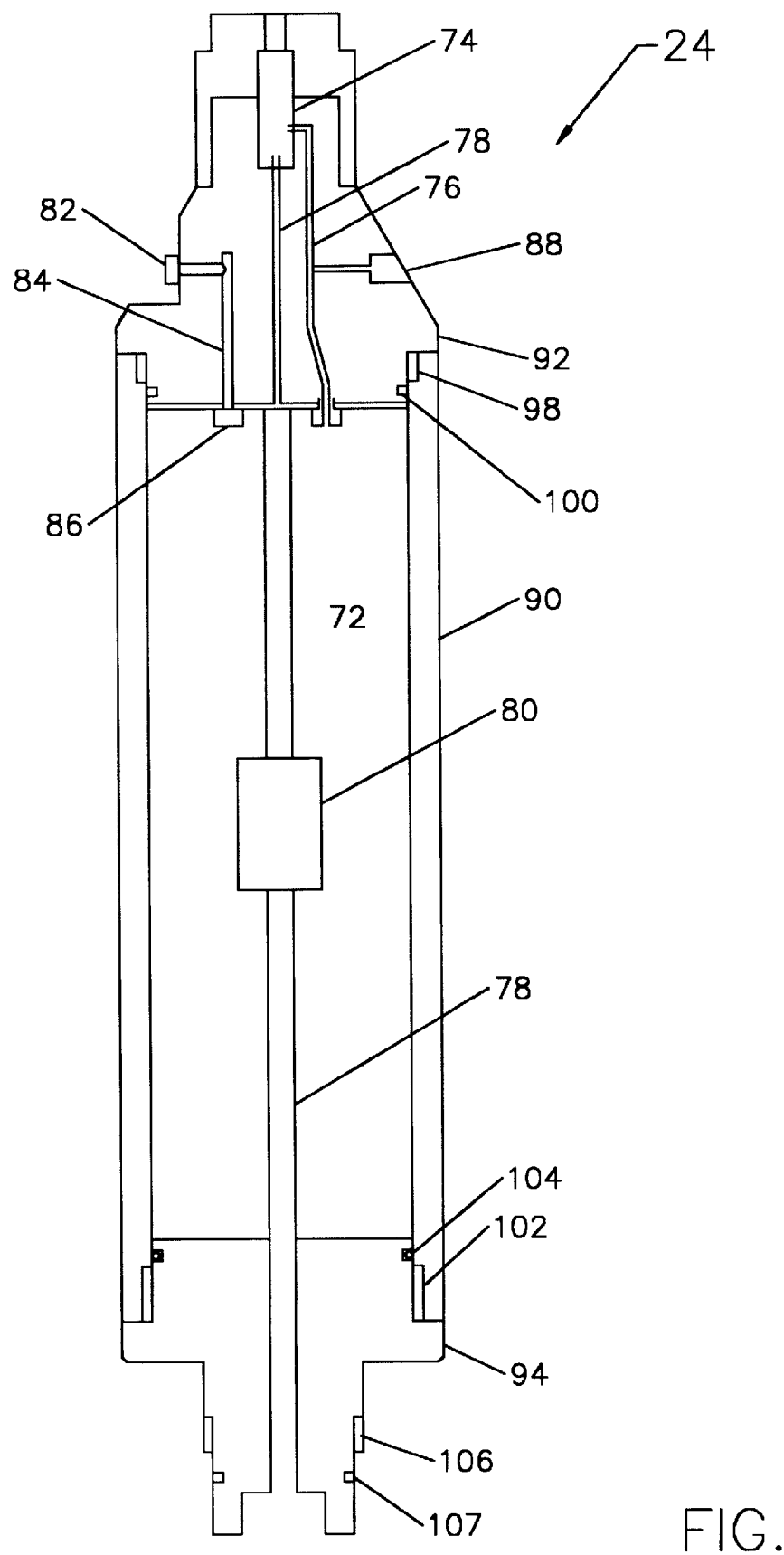
FIG. 4 shows a compressed gas storage container that may be utilized in a borehole.

FIG. 4 shows the compressed gas storage container configuration in more detail. The operation will be described in reference to FIG. 2, for convenience. Compressed gas is normally inserted into chamber 72 of compressed gas storage container 24 at the earth's surface. After the compressed gas storage container is lowered within the borehole to a selected depth, solenoid 74 is activated by means of a control signal transmitted from control instrumentation system 16 down wireline 8. Upon activation of solenoid 74, compressed gas flows from chamber 72 through conduit 76 and into conduit 78, which releases the gas into the top of tube wave deflector 20*d* though conduit 68. The gas passes through check valve 80, which enables gas to flow from conduit 78 into tube wave deflector 20*d*, but prevents any borehole fluid from flowing from the borehole into the compressed gas storage container 24.

Chamber 72 may be formed from a generally cylindrical member 90, having a hollow center, and upper head member 92 and lower head member 94. Upper head member 92 is secured to cylindrical member 90 by threaded connections 98 and O-ring seals 100. Lower head member 94 is secured to cylindrical member 90 by threaded connections 102 and O-rings seals 104.

At the surface, prior to insertion of the compressed gas storage container into the borehole, gas is injected into the chamber 72 through conduit 84. The gas flows through check valve 86. After the gas is inserted into the chamber 72, plug 82 may be inserted into the exterior opening of conduit 84 to prevent borehole fluid from entering the conduit. Valve mechanism 88 enables the gas to be removed from chamber 72 after the compressed gas storage container 24 is removed from the borehole without activating solenoid 74.

The compressed gas is normally released into the tube wave deflectors when the borehole source and/or borehole receiver is at the highest location in the borehole at which data are to be gathered. If a tube wave deflector canister is filled at a lower level, then as the source and/or receiver instrument is raised, the gas will expand and escape from the bottom of the tube wave deflectors and percolate toward the surface, thereby producing acoustic noise which might degrade the resulting data. Referring to FIG. 2, and FIGS. 3A, 3B and 3C, after solenoid 74 is activated to release gas into tube wave deflector 20*d*, the gas will initially displace any borehole fluid that has occupied the space within the canister of tube wave deflector 20*d*, and gas will then flow outwardly from the bottom of tube wave deflector 20*d* into the borehole and will percolate upwardly in the borehole fluid. The gas will then successively enter and fill the canisters of tube wave deflectors 20*c*, 20*b* and 20*a*. Conduit 68 of tube wave deflector 20*d* is connected to compressed gas storage container 24 by means of threaded connections 106 and O-rings which fit into O-ring grooves 107.

Referring to FIG. 1, the canisters of the tube wave deflectors are filled with gas in the same manner as described with reference to FIG. 2, except that compressed gas storage container is positioned below tube wave deflector and gas will be released through conduit 78 into the borehole fluid. The gas will percolate upwardly in the borehole fluid and successively fill the canisters of tube wave deflectors 20*b* and 20*a*.

Figure 5:
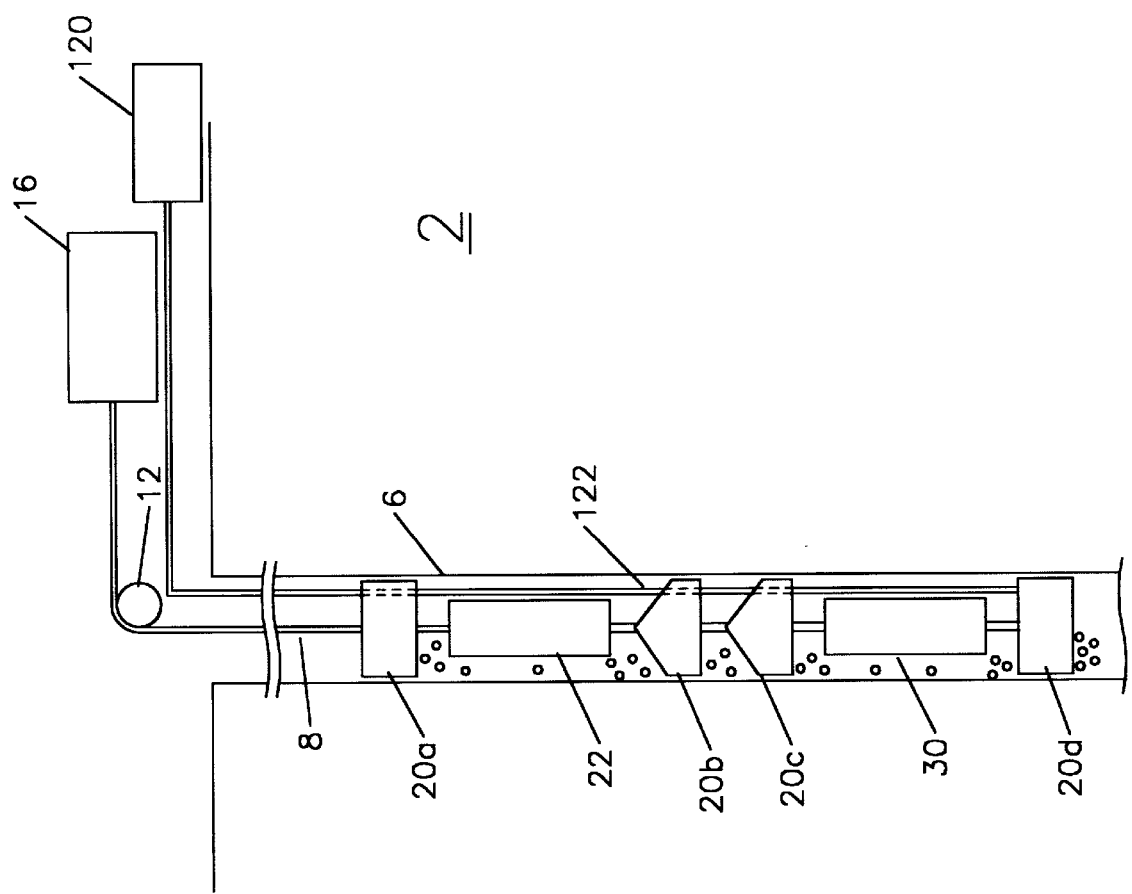
FIG. 5 shows a downhole seismic survey operation in which gas is conveyed downhole by a conduit extending from the surface.

In another embodiment of the invention, gas is supplied to the tube wave deflectors from a gas source at the earth's surface. With reference to FIG. 5, gas flows from gas source 120 on the earth's surface, down conduit 122 to the lower most tube wave deflector 20*d*. This embodiment is described in reference to the configuration in which the borehole source and borehole receiver are positioned in the same borehole, as in FIG. 2, although it is equally applicable to the configuration in which the borehole source and borehole receiver are deployed in separate boreholes as shown in FIG. 1. When the gas is released from conduit 122, the gas will initially fill the canister of tube wave deflector 20*d*. The gas will then percolate upwardly to fill successively the canister of tube wave deflectors 20*c*, 20*b* and 20*a*.

Figure 5A:
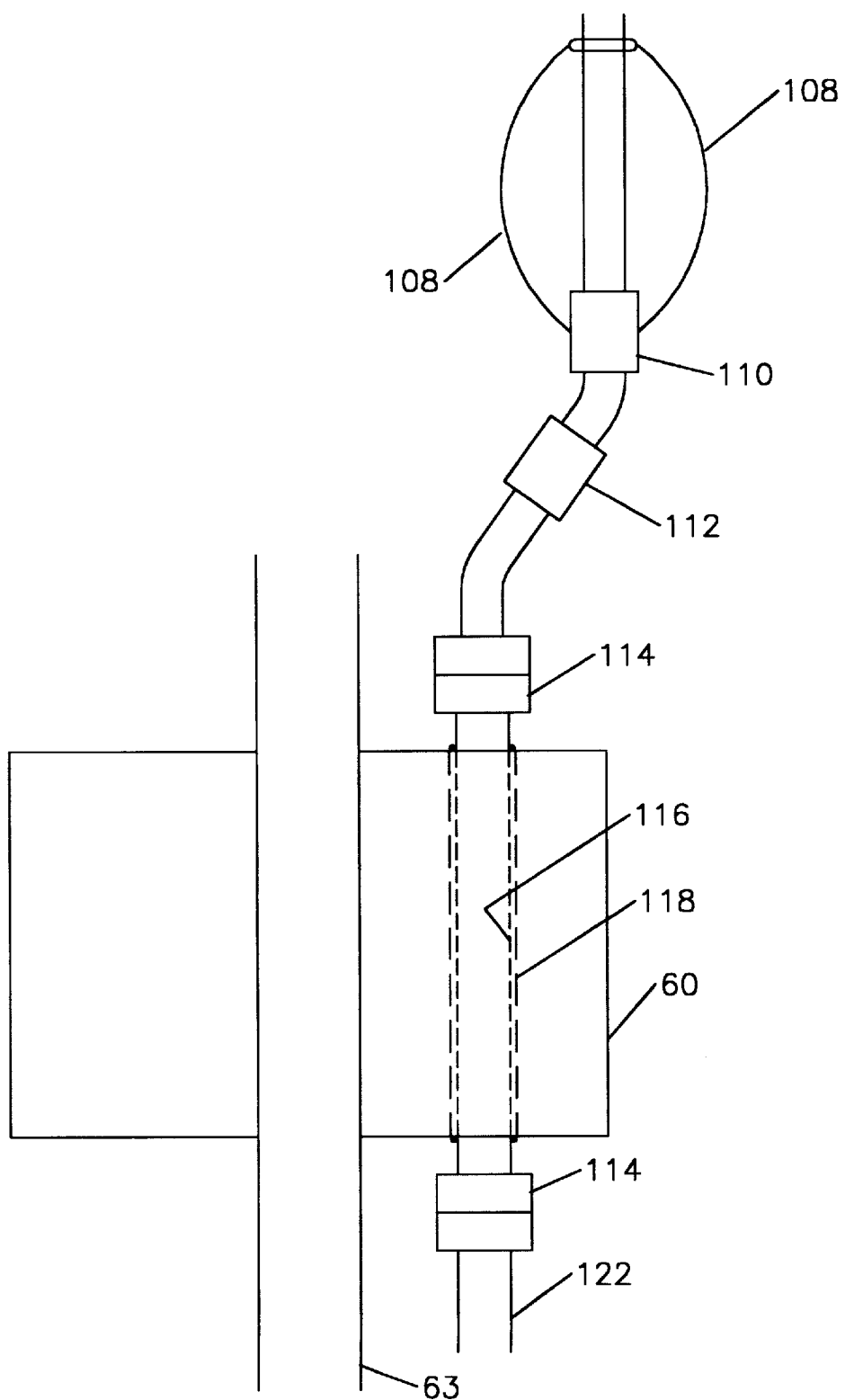
FIG. 5A shows a mechanism for detaching the conduit which carries gas from the earth's surface to the tube wave deflectors from the downhole assembly.

Because the tube wave deflectors will extend across substantially the entire diameter of the borehole, the conduit 122 may pass through the interior of tube wave deflectors 20*a*, 20*b* and 20*c* and release the gas directly into tube wave deflector 20*d*. With reference to FIG. 5A, a hole 118 is machined in mounting block 60, which surrounds tubular conduit 63, for each of tube wave deflectors 20*a*, 20*b*, 20*c* and 20*d*. A metal tube 116 is inserted through hole 118 and welded into position. Conduit 122 is connected to the metal tube by means of swivel fittings 114 on each side of mounting block 60 for tube wave deflectors 20*b* and 20*c* and on the top side of the mounting block for tube wave deflector 20*a*. Above tube wave deflector 20*a*, pressure relief and check valve 112 is included in conduit 122. When the borehole source and receiver apparatus reaches a selected borehole depth, normally the top of the zone of interest from which data will be recorded, the pressure from gas source 120 is increased, and when the pressure in conduit 122 exceeds the borehole pressure at that depth, gas will flow through pressure relief and check valve 112, and on down the conduit 122, and fill the tube wave deflector canisters as described previously.

After the borehole source/borehole receiver apparatus reaches the top of the zone of interest and the canisters of the tube wave deflectors are filled with gas, it is desirable to retract that portion of the gas carrying conduit 122 above tube wave deflector 20*a* in order to avoid entangling the conduit with the borehole source and receiver apparatus. Accordingly, a release mechanism, including quick release fitting 110 and lanyards 108, is utilized for that purpose. Normally, pressure is maintained in the conduit 122 above a selected level, for example 300 pounds per square inch, which is sufficient to prevent the quick release fitting from disengaging. When it is desired to release the conduit, the pressure is reduced at the surface, and a tension is applied to the lanyards which enables the quick release fitting to disengage. The portion of conduit 122 above tube wave deflector 20*a* is then retracted to the surface.

Only a single tube wave deflector is shown in the position of tube wave deflectors 20*a*, 20*b*, 20*c* and 20*d*. However, a plurality of such deflectors may be utilized in each position above and below the seismic source, as well as above and below the seismic receiver. Those of ordinary skill in the art will recognize also that alternative methods may be utilized for filling the tube wave deflector canisters after the tube wave deflectors are lowered into the borehole, including the producing of gas by electrical or chemical reactions with the borehole fluid.

As the tube wave deflectors are retracted to the earth's surface, the pressure around the tube wave deflectors will decrease, which will cause any gas in the canisters of the tube wave deflectors to expand. As the gas expands it will escape from the open bottom of the tube wave deflectors and percolate to the surface; thereby avoiding the danger of bladder rupture caused by expanding gases.

Figure 6:
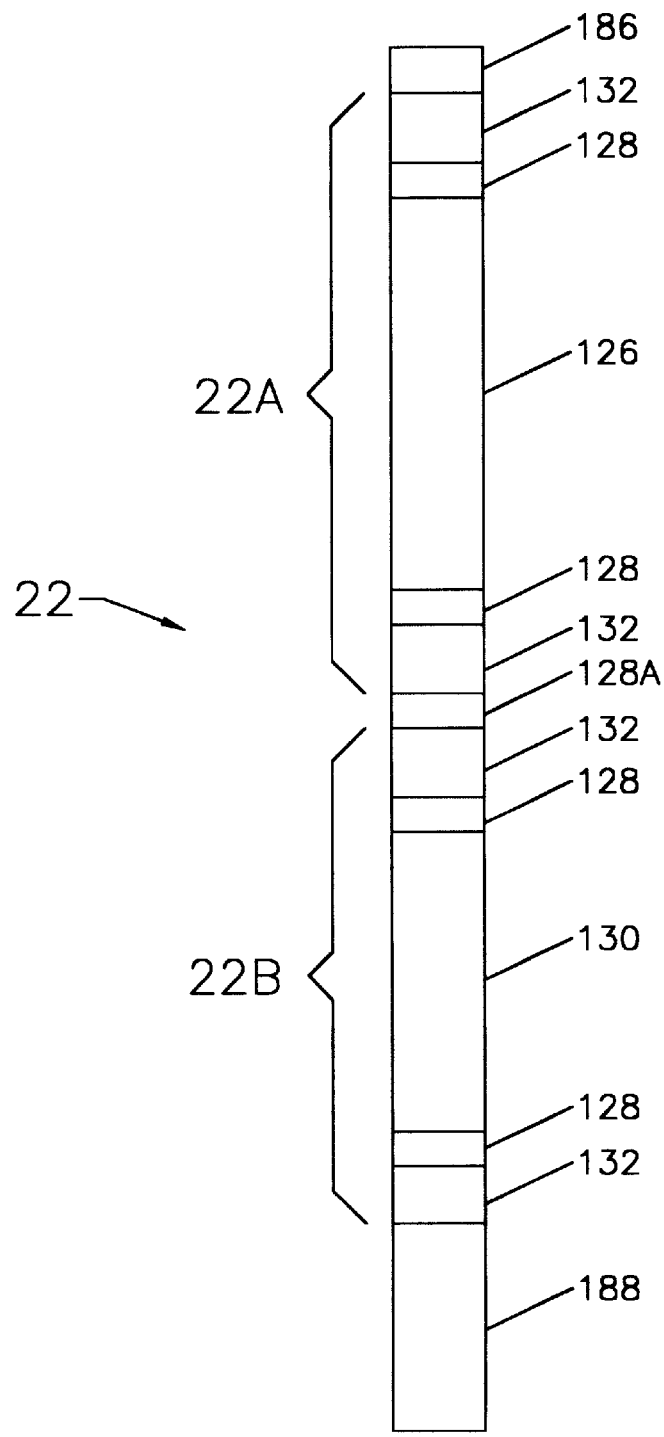
FIG. 6 shows a configuration for a borehole seismic source.

Borehole source 22 may be configured as shown in FIG. 6, which shows a source comprising source elements 22A and 22B. In a preferred embodiment, source elements 22A and 22B each comprise a piezoelectric actuator, adapted to generate a seismic signal over a selected frequency range, which might be, for example, 100 Hz. To 4000 Hz. Although a seismic signal may be generated over the entire selected frequency range, maximum power is generated at or near a resonance frequency of the actuator. In order to increase the frequency band over which a high energy level in generated, source elements 22A and 22B are adapted to achieve resonance at different frequencies within the desired frequency band. These resonance frequencies for source elements 22A and 22B may, for example, be selected as 110 Hz. and 150 Hz. Resonant frequencies are selected at lower frequencies because of the difficulty in generating sufficient power at the lower frequency range. Those of ordinary skill in the art will recognize that the resonant frequency will vary as the temperature changes.

Source element 22A comprises piezoceramic actuator 126, a connector 128 at each end thereof and a compliant end member 132 connected to each connector. Connector 128 is shown in more detail in FIG. 14 and compliant end members 132 are shown in more detail in FIGS. 13A, 13B and 13C.

Piezoceramic actuator 126 is formed from a plurality of piezoceramic cylinder elements, such as shown in FIG. 10, designated by numeral 132. Piezoceramic element 132 is formed from a cylinder of piezoceramic material, with electrically conductive bands 134 deposited thereon. Electrically conductive wires 136 and 138 are then run around the interior circumference of each piezoceramic element 132. An electrical connection is made at locations 144 by soldering or other means, between electrically conducting wire 136 and a first set of alternating conductive stripes 134, and an electrical connection is made at locations 146 between electrical conductor 138 and a second set of alternating conducting stripe 134. Each stripe in the second set of alternating stripes is positioned in intermediate positions between the stripes in the first set of conductive stripes. Electrically conducting wire 140 is then electrically connected to conducting wire 136, and electrically conducting wire 142 is electrically connected to conducting wire 138.

Each piezoceramic cylinder 132 is prestressed by winding, under tension, a high strength fiber, such as glass fiber, around the exterior circumference of the cylinder. These fibers may be translucent and are not shown on the drawing. Because the piezoceramic material is weak under tension, the piezoceramic cylinders are maintained under compression by the fiber windings, which enables the piezoceramic elements to generate higher output power without risking mechanical failure. A plurality of the piezoceramic cylinders 132 are joined end to end to form the piezoceramic actuator. In the case of actuator 126, twenty-six cylinder elements may be employed, as illustrated in FIG. 8, with each cylinder element having an outside diameter of 3.5 inches, a thickness of 0.2 inches, and a length of 2 inches. Those of ordinary skill in the art will recognize that these dimensions represent a design choice and that other dimensions could be equally as useful. For example, different outside diameters might be selected to fit borehole instruments adapted to operate in different diameter boreholes. After assembly, the piezoceramic cylinders are sprayed with a conformal coating for insulation As shown in FIG. 8, a mounting ring 150 is positioned between each piezoceramic cylinder 132. The outer portion of mounting ring 150 extends over the edges of adjacent piezoceramic cylinders 132 to align the cylinders, and a center portion of mounting rings 150 extends between adjacent piezoceramic cylinders 132 to provide electrical isolation. Electrically conducting wires 140 and 142 for each piezoceramic cylinder are routed through an aperture 167 in mounting ring 150 and are connected respectively to positive and negative electrical buses (not shown) which run the length of the assembled cylinder elements 132. Those of ordinary skill in the art will recognize that when an alternating voltage signal is applied between electrically conducting wires 140 and 142, the diameter of piezoceramic cylinders 132 will contract and expand in response to the applied electrical voltage.

FIG. 8 shows piezoceramic cylinder assembly 152 comprising the assembled piezoceramic cylinders 132, mounting rings 150 and a mounting isolator 158 at each end of the assembled piezoceramic cylinders 132. Mounting isolator 158 is shown in more detail in FIG. 9. Mounting isolators 158 include a plurality of apertures 157 to provide acoustic transparency. Cylindrical end 162 of mounting isolator 158 fits partially over the endmost piezoceramic cylinder 132. Cylindrical portion 160 of mounting isolator 158 fits into an end of a connector 128. Mounting isolators 158, which may be made of PEEK (polyetheretherketone) material, provide physical centralization, electrical isolation and acoustic transparency for the piezoceramic cylinder assembly.

In assembling piezoelectric actuator 126, a plurality of mounting struts 154, shown in FIG. 12, will extend along the length of piezoceramic cylinder assembly 152 to provide structural integrity. Mounting struts 154 include a plurality of evenly spaces holes 166. When assembled, these holes 166 will align with threaded holes 168 in mounting rings 150. Screws (not shown) are inserted in each pair of aligned holes to secure the mounting struts 154 to the mounting rings 150. The last threaded hole 166 at each end of strut 154 will be aligned with a hole 170 at end 162 of a mounting isolator 158. The assembled piezoceramic cylinders are then placed inside a sleeve 180 shown in FIG. 7. Sleeve 180 isolates the piezoceramic cylinder assembly from borehole fluids, and may be formed from a thin sheet of metal, such as stainless steel or Inconel™. (Inconel is a trademark of Inco Alloys International, Inc.)

Sleeve 180 should be sufficiently thin so that it is acoustically transparent to the signal generated by the piezoceramic cylinders. Sleeve 180 may be about the same length as piezoceramic cylinder assembly 152. A typical thickness for sleeve 180 is about 0.020 inches. The end of sleeve 180 will fit over an end 176 of a connector 128. O-rings (not shown) are inserted in O-ring grooves 178 to form a seal between sleeve 180 and connector 128.

A compliant end member 132 is attached to each end of piezoceramic actuator 126 by means of connectors 128. Connector 128 is shown in more detail in FIG. 14 and compliant end member 132 is shown in more detail in FIGS. 13A, 13B and 13C. Referring to FIG. 13A, compliant end member 132 comprises a tubular section 172, which may have a square cross-section, and which may be formed from a thin sheet of gas impermeable, flexible material, which, preferably, is resistant to corrosion from chemicals which may be present in the borehole. The material from which the square tubular section 172 is formed may be about 0.025 inches (0.0635 centimeters) thick. Tubular section 172 is preferably slightly rounded at the corners as shown in FIG. 13B. Tubular section 172 is affixed, preferably by welding, to cylindrical connecting members 174. A cylindrical member 182, which may be welded at each end to cylindrical connecting members 174 is included inside tubular section 172 for structural support. Cylindrical member 182 may be made of stainless steel or other strong metal, and includes a large number of apertures 184 so that it will be acoustically transparent. Cylindrical connecting members 174 fit over end portion 176 of connectors 128. O-rings (not shown) are inserted in O-ring grooves 178 to form a seal between the compliant end members 132 and connector 128. As shown in FIG. 14, connector 128 is hollow to allow passage of fluid therethrough. FIG. 6 shows connector 128A forming one end of source element 22A. Connector 128A may have a solid center. However, it has also been determined that the compliant end member 128 at the end of source element 22A adjacent source element 22B may also serve as a compliant end member for source element 22B, thereby eliminating the need for connector 128A and one compliant end member. Although a preferred embodiment has been described in terms of a square tubular section 172, any shape which is capable of significant expansion and contraction in response to fluctuations in internal pressure may be utilized. Useful results will be achieved if this tubular section is formed in other flat sided configurations, for example, triangular, rectangular, pentagonal and so on, although the closer the cross-section comes to being circular the less effective the configuration will be in achieving the desired result. A corrugated cross-section may also be used for tubular member 172, but such a shape may be more difficult to manufacture. Compliant end member 132 may be formed from stainless steel, Inconel, beryllium copper, or other material having similar qualities of resilience and gas impermeability, and preferably resistance to corrosion from borehole chemicals.

Figure 16:
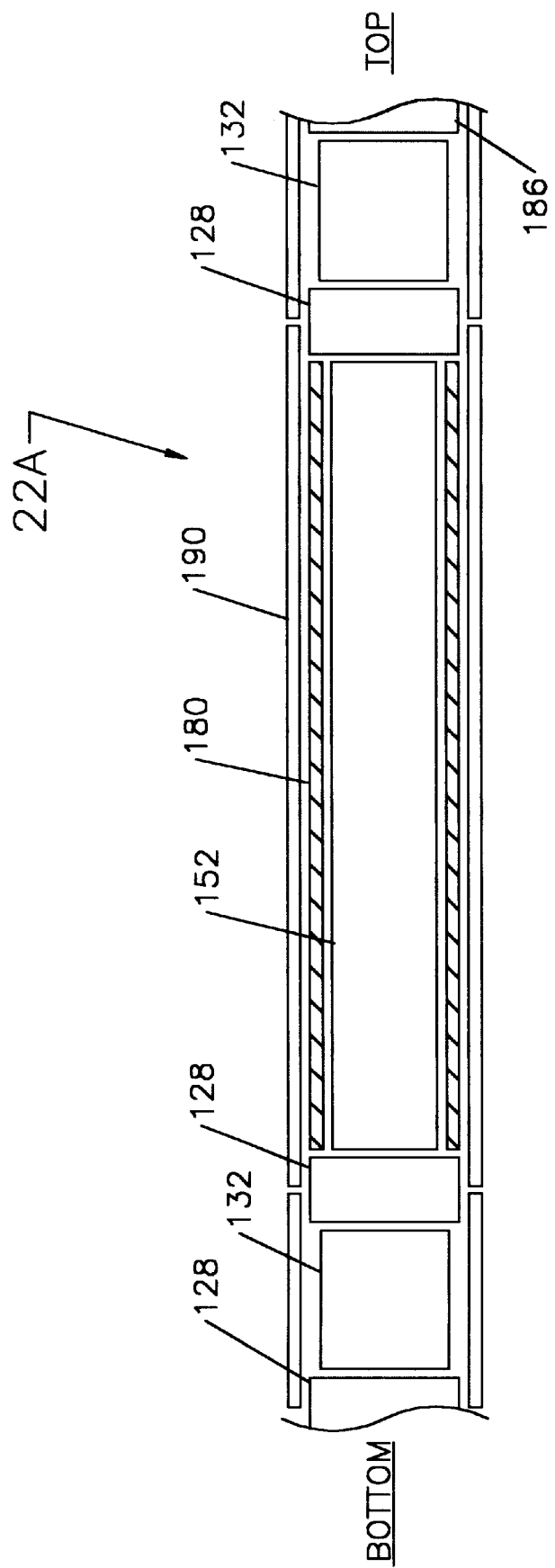
FIG. 16 is a schematic which illustrates the assembly of the seismic source.

FIG. 15 shows a section of the exoskeleton 190 which forms the external structural housing for the source 22. A large number of apertures 192 are included in the surface so that the exoskeleton will be substantially acoustically transparent to the seismic signal generated by source element 22A (and 22B). FIG. 16 is a schematic which illustrates the assembly of source element 22A. The purpose of this schematic is to aid in understanding the assembly of the seismic source, and many details of the individual elements have been omitted for clarity. FIG. 16 shows piezoceramic ring assembly 152 with a connector 128 attached to each end of piezoceramic ring assembly 152. Sleeve 180 surrounds the piezoceramic ring assembly 152 in the lateral direction. A compliant end member 132 is attached to each end of piezoceramic ring assembly 152 by a connector 128. Another connector 128 is attached to the other end of the compliant end member which is on the end of source element 22A designated as "bottom", and top sub 186 is attached to the other end of the compliant end member which is on the end of the source element 22A designated as "top". Exoskeleton 190 is shown forming the outer surface of seismic source element 22A. Referring to FIGS. 14 and 15, the holes 194 in exoskeleton 190 will align with holes 196 in connector 128 and screws (not shown) are inserted through these holes in the assembly of the source element. The construction of source element 22B is analogous to the assembly of source element 22A and will not be discussed in detail.

Source element 22A is activated by applying an electrical signal, which may be a swept sine wave, across the electrical bus to which electrical conductor 140 is connected and the electrical bus to which electrical conductor 142 is connected. Application of this electrical signal will cause piezoceramic cylinders 132 to expand and contract in response to the magnitude and phase of the applied electrical signal, thereby projecting an acoustic signal into the earth's subsurface surrounding the borehole. In one particular embodiment, the applied electrical signal may be swept over a frequency range extending from 100 Hz. to 4000 Hz. Sleeve 180 and the two compliant end members 132 on each side of sleeve 180 form a cavity which is filled with fluid, which may be a perfluorinated liquid, such as Fluorinert™ fluid, from the 3M Company. Those of ordinary skill in the art will recognize that the magnitude of energy projected by source element 22 will be enhanced at the resonance frequency of the fluid filled cavity formed by sleeve 180 and the two compliant end members 132. Those of ordinary skill in the art are aware that the resonant frequency of an elongated fluid filled cavity for half wave resonance is:

$$f=c/2L.$$

where f=frequency; c is the acoustic velocity of the fluid in the cavity; and L is the length of the cavity. In one embodiment of the invention, the length of the cavity may be selected to achieve a nominal resonance frequency of 110 Hz., in order to increase the magnitude of the generated signal at the lower end of the frequency sweep. The internal volume of the compliant end members, which may be formed from a thin sheet of resilient metal and have a square cross-section, is capable of expanding and contracting in response to variations in internal pressure to a much greater extent than a cylinder is capable of, thereby projecting greater energy into the earth's subsurface.

Borehole source element 22B is formed and operated in the same manner as borehole source element 22A, except that if the resonance frequency is selected to be 150 Hz., its length will be shorter than that of source element 22A, whose resonance frequency was selected to be 110 Hz. Also shown in FIG. 6 is pressure compensator 188, which serves to equalize the pressure inside source 22 with the pressure in the borehole. Pressure equalizer 188 might comprise, for example, a cylinder and piston, with the piston blocking fluid flow into and out of the source 22, but movable inside the cylinder in response to pressure on either side of the piston to maintain the pressure inside the borehole source at the same level as the pressure in the borehole. Such pressure equalizers are well known to those of ordinary skill in the art and will not be discussed in detail. At the opposite end of the borehole source from the pressure equalizer 188 is top sub 186, which is a standard adapter tool which allows a standard wireline conductor to enter the borehole source. Top sub 186 also includes a fluid conduit to allow fluid to be inserted into the center of source elements 22A and 22B.

The invention has been described with a certain degree of particularity, however, many changes may be made in the details without departing from the scope of the invention. It is understood that the invention is not limited to the embodiments set forth herein, but is to be limited only to the scope of the attached claims, including the full range of equivalency to which each element thereof is entitled.

I claim:

1. A method of gathering borehole seismic data comprising:
   lowering into a borehole in the earth's surface by means of a wireline
   (a) a borehole acoustic instrument;
   (b) a first open bottom, enclosed top canister positioned above said borehole instrument; and
   (c) a second open bottom, enclosed top canister positioned below said borehole instrument; and
   at least partially filling said first and second canisters with a gas after said canisters have been lowered into said borehole.

2. The method of claim 1 wherein said canisters are substantially cylindrical.

3. The method of claim 1 wherein said first canister is one of a plurality of open bottom, enclosed top canisters and said second canister is one of a second plurality open bottom, enclosed top canisters.

4. The method of claim 1 wherein said borehole acoustic instrument is a signal generator for generating a seismic signal in said borehole and the second canister has a top surface formed from a material having an acoustic compliance greater than the compliance of the fluid in said borehole.

5. The method of claim 1 wherein said borehole acoustic instrument is a seismic signal detector and the first canister has a top surface formed from a material having an acoustic compliance greater than the compliance of the fluid in said borehole.

6. The method of claim 4 wherein said material from which the top surface is formed is an elastomeric material.

7. The method of claim 5 wherein said material from which the top surface is formed is an elastomeric material.

8. The method of claim 1 wherein said second canister is filled with a gas from a source of gas and after said second canister is filled, gas percolates from beneath said second canister upwardly in said borehole fluid and at least partially fills said first canister.

9. The method of claim 8 wherein said source of gas is a gas container at the earth's surface and a conduit which extends from said gas source down the borehole to the location of said second canister.

10. The method of claim 8 wherein said source of gas is a container of compressed gas which is lowered into said borehole along with said acoustic instrument and said first and second canister.

11. The method of claim 9 further comprising retracting said conduit from said borehole after said canisters have been substantially filled with gas.

12. The method of claim 1 wherein said gas is nitrogen.

13. The method of claim 1 wherein said gas is helium.

14. A method of gathering borehole seismic data comprising:
    lowering into a borehole in the earth's surface by means of a wireline
    (a) a borehole acoustic instrument comprising a borehole seismic source and a borehole seismic receiver;
    (b) a first plurality of open bottom, enclosed top canisters positioned above said borehole receiver on said wireline;
    (c) a second plurality of open bottom, enclosed top canisters positioned below said borehole receiver on said wireline;
    (d) a third plurality of open bottom, enclosed top canisters positioned above said borehole source on said wireline;
    (e) a fourth plurality of open bottom, enclosed top canisters positioned below said borehole source on said wireline; and
    filling the lower most of said canisters with a gas after said canisters have been lowered into the borehole by said wireline and allowing said gas to percolate upwardly in said borehole fluid from below said lower most canister and successively substantially filling with gas the other of said canisters included in said first, second, third and fourth plurality of canisters.

15. The method of claim 14 wherein at least one of said first and fourth plurality of canisters has a top surface comprising a material having a greater acoustic compliance then the compliance of the borehole fluid.

16. The method of claim 15 wherein said material is an elastomer.

17. The method of claim 14 wherein said canisters are substantially cylindrical.

18. The method of claim 14 further comprising lowering into said borehole by means of said wireline a container of compressed gas and;
    wherein said canisters are substantially filled with gas from said container.

19. The method of claim 14 further comprising lowering into said borehole, by means of said wireline, the lower end of a conduit, the upper end of said conduit being connected to a source of gas at the earth's surface and;
    wherein said canisters are substantially filled with gas from said source of gas by means of said conduit.

20. The method of claim 19 further comprising retracting said conduit to the earth's surface after said canisters are at least partially filled with gas.

21. The method of claim 14 wherein said gas is nitrogen.

22. The method of claim 14 wherein said gas is helium.

23. An apparatus for reflecting tube waves in a fluid-filled borehole comprising:
    a substantially cylindrical canister having a diameter adapted to enable said canister to be deployed within said fluid-filled borehole, and having an enclosed upper end and an open lower end;
    means for attaching said substantially cylindrical canister to a wireline for conveying said canister into said borehole; and
    means for at least partially filling said canister with a gas after said canister is deployed in said borehole.

24. The apparatus of claim 23 wherein said means for at least partially filling said canister comprises a compressed gas storage container which is lowered into said borehole along with said substantially cylindrical canister.

25. The apparatus of claim 23 wherein said means for at least partially filling said canister comprises a gas container at the earth's surface and a conduit which extends from said gas container down the borehole to the location of said canister.

* * * * *